Patented June 24, 1930

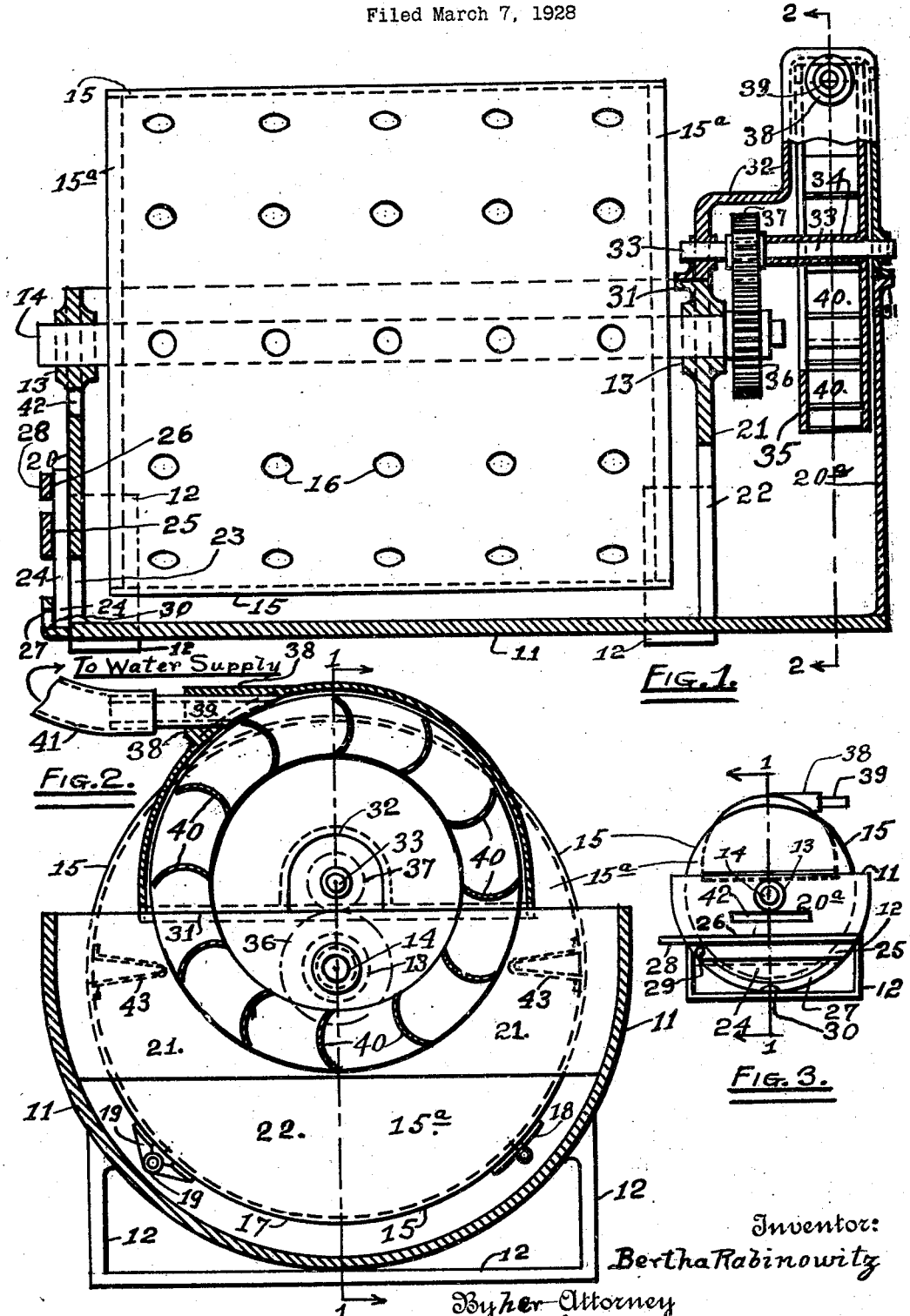

1,767,615

UNITED STATES PATENT OFFICE

BERTHA RABINOWITZ (NÉE BRIER), OF BROOKLYN, NEW YORK

APPARATUS FOR WASHING VEGETABLES

Application filed March 7, 1928. Serial No. 259,816.

My invention relates to improvements in an apparatus for washing vegetables, and particularly to an apparatus for washing spinach, and it consists in the novel features, which are hereinafter more fully described.

One of the objects of my improvement is,—to provide an apparatus for washing spinach, or other vegetables and things, in which the latter are kept immersed, or partly immersed, in water while they are being washed.

Another object of my invention is,—to have the water circulating through the said apparatus while the spinach, or other vegetables and things, are being washed.

A further object of my invention is,—to have a part of the above apparatus, which encloses the spinach, or other vegetables and things, revolving and immersed or partly immersed in water.

Another object of my invention is,—to have said revolving part of my apparatus actuated by a water motor and to have the discharge from said motor employed for washing said spinach or other vegetables and things.

A further object of my invention is,—to reduce the velocity of rotary motion from said motor to said revolving part, thereby increasing the efficiency of my apparatus.

Another object of my invention is,—to provide a variable means for discharging the water from my apparatus, thereby controlling the depth of the water therein.

Other objects and advantages will hereinafter appear.

I attain these objects by the apparatus, one form of which is illustrated in the accompanying drawings, or by any mechanical equivalent or obvious modification of the same.

In the drawings, Fig. 1 is a vertical section of my apparatus on the line 1—1 of each of Figures 2 and 3, showing some parts in elevation.

Fig. 2 is a section on the line 2—2 of Fig. 1; and Fig. 3 is an end elevation of my apparatus for washing vegetables, looking from left to right in Fig. 1.

Like numerals refer to like parts throughout the several views.

11 designates a container for water in the form of a trough, which is supplied with legs 12, to be placed preferably near a faucet and a sink, and has thereon two vertical ends 20 and 20$^a$ and a partition 21, which is spaced from the bottom of said trough 11, leaving therebetween a passage 22, for a purpose, which is hereinafter described.

Said end 20 and said partition 21 are provided with bearings 13 for a shaft 14, which has mounted thereon a receptacle for the things to be washed in the form of a drum 15—15$^a$, which consists of a cylindrical shell 15, which may be made of sheet metal, secured to two end discs 15$^a$ and having thereon openings or perforations 16.

The shell 15 may also and preferably be made of wire screen, if desired; and it is provided with interior ribs 43, as shown in Fig. 2.

The drum 15—15$^a$ has thereon a cylindrical cover, 17, which may be connected thereto by one or more hinges 18 and one or more pairs of ring plates 19, to enclose a rod or wire passed therethrough, whereby said cover may be secured in position on said drum 15—15$^a$.

The end 20 of said trough 11 has therein a weir 23, which may be partly or entirely closed by a gate 24, which is positioned between said end 20 on one side thereof and a guide 25 and a flange 27 on said trough 11 on the other side thereof.

The guide 25 may be a resilient bar, arranged to press said gate 24 against the outer side of said end 20, to prevent leakage of water therebetween, and said flange 27 is provided with a sand discharge opening 30, to permit sand and dirt to be washed out therethrough from the bottom of said trough 11.

The gate 24 is shown as pivotally connected at 29 to said end 20 and has secured thereto a bar 26, which terminates in a handle 28, whereby said gate 24 may be manipulated and placed in any required position to secure the proper extent of opening of said weir 23; the resilience of said guide 25 serves also to keep said gate 24 in place by friction in opposition to the force of gravity.

Said end 20ᵃ and said partition 21 have at their upper edge flanges 31, for a top casing 32, to be mounted thereon.

The casing 32 has revolvably connected thereto a spindle 33 and a hub 34 of a water motor 35.

A gear 36 is secured to the end of said shaft 14, in mesh with a gear 37 on said spindle 33, to reduce the speed of said shaft 14 from said motor 35 and to raise the latter above the level of the water, which may be contained in said trough 11.

The top casing 32 has thereon a socket 38 for the end of a nozzle 39, to be placed therein, for discharging a stream of water onto the buckets 40 of said motor 35.

A flexible tube 41 may be employed for connecting the outer end of said nozzle 39 to a faucet or other source of water supply.

The water discharged from said motor is passed through said passage 22 and trough 11 on the way to the weir 23, and the depth of the water in said trough 11 may be regulated by means of said gate 24.

An overflow 42 is provided in said end 20, to limit the maximum depth of water in said trough 11, and it may be placed at any desired elevation other than as shown in Fig. 1.

Spinach, or any other vegetable or thing, which is to be washed, is placed in said drum 15—15ᵃ, which is then revolved by said motor 35 and gears 36 and 37; the velocity of said motor 35 may be regulated by means of said faucet.

The sand and dirt contained in the spinach, or other vegetable or thing, is washed away and discharged through the weir 23 and said opening 30 at the end of said trough 11, which may be placed over a sink or other water discharge or receptacle.

In large sizes of my apparatus an electric motor may be employed to revolve the drum 15—15ᵃ instead of a water motor, if desired; in small sizes of my machines the gears 36 and 37 may be omitted and the motor 35 secured directly to the shaft 14, if desired.

Many other changes may be made in the details of my apparatus for washing vegetables without departing from the main scope of my invention, and parts of my invention may be used without other parts.

I do not, therefore, restrict myself to the details as shown in the drawings, but I intend to include also all mechanical equivalents and obvious modifications of the same within the scope of my invention.

I claim as my invention and desire to secure by Letters Patent:—

1. In an apparatus for washing vegetables a container for water, a means for connecting said container to a source of water supply, a weir, for continuously discharging water from said container, thereby causing a stream of water from said supply continuously to pass through said container, a perforated receptacle for the vegetables to be washed movably suspended over the bottom of said container, and a means for continuously moving said receptacle in a plane transversely to the flow of said stream, to have said vegetables washed by said stream.

2. In an apparatus for washing vegetables a container for water, a means for connecting said container to a source of water supply, a weir, for continuously discharging water from said container, thereby causing a stream of water from said supply continuously to pass through said container, a gate, for regulating the extent of opening of said weir, thereby regulating the depth of water in said container, a perforated receptacle for the vegetables to be washed, movably suspended over the bottom of said container, and a means for continuously moving said receptacle in a plane transversely to the flow of said stream, to have said vegetables washed by said stream.

3. In an apparatus for washing vegetables a water motor, a container for water, terminating at one end thereof in a casing for said motor, said casing being open at the lower end thereof and arranged to discharge its water into said container, a nozzle on said casing for directing a stream of water onto the blades of said motor, a means for connecting said nozzle to a source of water supply, a weir, for continuously discharging a stream of said water from said container, and a perforated receptacle for the vegetables to be washed, revolvably suspended over the bottom of said container and operatively connected to said motor, continuously to revolve in a plane transversely to the flow of said stream.

4. In an apparatus for washing vegetables a container for water, a means for connecting said container to a source of water supply, a means for continuously discharging water from said container, thereby causing a stream of water from said supply continuously to pass through said container, a receptacle, comprising a shell made of wire screen, for enclosing the vegetables to be washed, movably suspended over the bottom of said container, and a means for continuously moving said receptacle in a plane transversely to the flow of said stream, to have said vegetables washed by said stream.

BERTHA RABINOWITZ (née BRIER).